(12) United States Patent
Bredif et al.

(10) Patent No.: US 10,921,293 B2
(45) Date of Patent: Feb. 16, 2021

(54) METHOD AND DEVICE FOR DETECTING AND CHARACTERIZING A REFLECTING ELEMENT IN AN OBJECT

(71) Applicant: COMMISSARIAT A L'ENERGIE ATOMIQUE ET AUX ENERGIES ALTERNATIVES, Paris (FR)

(72) Inventors: Philippe Bredif, Paris (FR); Ekaterina Iakovleva, Limours (FR); Dominique Lesselier, Gif-sur-Yvette (FR); Olivier Roy, St Jacques de la Lande (FR); Kombossé Sy, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 130 days.

(21) Appl. No.: 16/341,035

(22) PCT Filed: Oct. 10, 2017

(86) PCT No.: PCT/EP2017/075814
§ 371 (c)(1),
(2) Date: Apr. 10, 2019

(87) PCT Pub. No.: WO2018/069321
PCT Pub. Date: Apr. 19, 2018

(65) Prior Publication Data
US 2019/0234909 A1 Aug. 1, 2019

(30) Foreign Application Priority Data

Oct. 12, 2016 (FR) .................... 16 59860

(51) Int. Cl.
*G01N 29/44* (2006.01)
*G01N 29/06* (2006.01)
(Continued)

(52) U.S. Cl.
CPC .......... *G01N 29/4409* (2013.01); *G01H 5/00* (2013.01); *G01N 29/043* (2013.01);
(Continued)

(58) Field of Classification Search
CPC .......... G01N 29/4409; G01N 29/0672; G01N 29/0654; G01N 29/07; G01N 29/043; G01N 29/069; G01N 29/4445; G01N 29/262
See application file for complete search history.

(56) References Cited

U.S. PATENT DOCUMENTS 5,971,923 A * 10/1999 Finger .................. A61B 8/00
600/437
8,885,903 B2 * 11/2014 Thibault ............... G06T 11/003
382/131
(Continued)

FOREIGN PATENT DOCUMENTS

FR 3 029 636 A1 6/2016

OTHER PUBLICATIONS

Fidahoussen, et al., "Imaging of defects in several complex configurations by simulation-helped processing of ultrasonic array data", Review of progress in QNDE, vol. 29, pp. 847-854, Jan. 1, 2009.
(Continued)

*Primary Examiner* — Helen C Kwok
(74) *Attorney, Agent, or Firm* — BakerHostetler (57) ABSTRACT

A method and device are provided for determining a mode of detection of an element that reflects ultrasonic waves, wherein it comprises at least the following steps: For each point P of a given volume Zr, determining an ultrasonic field value $A_{ij}^m$ (P) for N emitter-receiver pairs (i, j) and for one detection mode m,
(Continued)

computing a number $$C^m(P, \vec{n}) = \sum_{i,j=1}^{N} c_{ij}^m(P, \vec{n})$$

of reflections of the wave where $$c_{ij}^m = \begin{cases} 1 & \text{if } |\vec{n}_{ij}^m(P) \cdot \vec{n}| = 1 \\ 0 & \text{if not} \end{cases}$$

with $\vec{n}_{ij}^m(P)$ the normal formed by the "forward" direction $\vec{d}_i$ and the "backward" direction $\vec{d}_j$ of the ultrasonic wave emitted and reflected by the reflecting element, computing the energy value $E^m(P, \vec{n})$ for each point P of the zone Zr, with $\vec{n}$ and for a plurality of modes m with $$E^m(P, \vec{n}) = \sum_{i,j=1}^{N} A_{ij}^m(P) c_{ij}(P, \vec{n})$$

comparing the obtained energy values $E^m(P, \vec{n})$ to one or more threshold values Es, selecting the one or more energy values that meet the one or more threshold-value conditions, and deducing a mode to be used to construct a representation of the reflecting element.

8 Claims, 5 Drawing Sheets

(51) Int. Cl.
  *G01N 29/26* (2006.01)
  *G01N 29/07* (2006.01)
  *G01N 29/04* (2006.01)
  *G01S 15/89* (2006.01)
  *G01H 5/00* (2006.01)
(52) U.S. Cl.
  CPC ....... *G01N 29/069* (2013.01); *G01N 29/0654* (2013.01); *G01N 29/0672* (2013.01); *G01N 29/07* (2013.01); *G01N 29/262* (2013.01); *G01N 29/4445* (2013.01); *G01S 15/8915* (2013.01); *G01S 15/8977* (2013.01); *G01S 15/8997* (2013.01); *G01N 2291/011* (2013.01); *G01N 2291/023* (2013.01); *G01N 2291/044* (2013.01); *G01N 2291/056* (2013.01); *G01N 2291/106* (2013.01)

(56) References Cited

U.S. PATENT DOCUMENTS

| 9,730,673 | B2* | 8/2017 | Robert | A61B 8/145 |
| 9,846,224 | B2* | 12/2017 | Bredif | G01N 29/262 |
| 2004/0264626 | A1* | 12/2004 | Besson | A61B 6/563 |
| | | | | 378/4 |

OTHER PUBLICATIONS

Paillard, et al., "New Ultrasonic Array Imaging of Crack-Type Defects Based on Simulation-Helped Processing", 10th European Conference on Non-Destructive Testing, Jun. 2010.
Calmon, et al., "Model based reconstruction of UT array data", AIP Conference Proceedings, vol. 975, pp. 699-706, Jan. 1, 2008.
Fidahoussen, et al., "Development of ultrasonic reconstruction methods for locating and characterizing defects", Sep. 21, 2012.
Holmes, et al., "Post-Processing of the full matrix of ultrasonic transmit-receive array data for non-destructive evaluation", NDt&E international, vol. 38, pp. 701-711, 2005.

\* cited by examiner

Direct trip

FIG.1a

Corner-echo trip

FIG.1b

Indirect trip

METHOD AND DEVICE FOR DETECTING AND CHARACTERIZING A REFLECTING ELEMENT IN AN OBJECT

CROSS-REFERENCE TO RELATED APPLICATIONS

This application is a National Stage of International patent application PCT/EP2017/075814, filed on Oct. 10, 2017, which claims priority to foreign French patent application No. FR 1659860, filed on Oct. 12, 2016, the disclosures of which are incorporated by reference in their entirety.

FIELD OF THE INVENTION

The invention relates to a method and device allowing one or more reconstruction modes for detecting and characterizing defects, in particular by synthetically focused multimode imaging, to be defined.

It is also applicable to any field in which it is sought to detect and characterize elements capable of reflecting an ultrasonic wave, the elements being embedded in an object and possibly being structural defects, dislocations, cracks, etc.

It may also be employed to characterize the profile of a part.

BACKGROUND

In the field of nondestructive testing, many ultrasonic imaging techniques are currently employed. These techniques are an important tool in the application of nondestructive testing to materials and assemblies in many high-tech industrial fields such as the energy sector, the petrochemical sector, the steelmaking industry, the transportation industry, etc. These techniques allow information on absolute location and increasingly realistic descriptions of the morphology of structural defects to be obtained.

Characterization method and ultrasonic-imaging technique are closely related. In this sense, phased-array techniques have considerably improved analysis capabilities.

Methods employing synthetic focusing, such as the total focusing method (TFM), for example allow realistic echographic imaging of the inspected material to be achieved using conventional phased-array instrumentation. The resolution of TFM images is optimal throughout the obtained view. By construction, these TFM images have the advantage of being insensitive to shadowing effects and to multiple reflections. Depending on the propagation mode and polarity of the selected waves, TFM imaging allows bulk defects or vertical plane defects to be detected. This realistic representation is highly advantageous for the characterization of defects, and of cracks in particular. TFM images are therefore easier to analyze; there is less risk that they will be incorrectly interpreted and allow more rapid testing by less specialized operators to be envisioned.

Synthetic focusing methods produce images by carrying out in sequence two main steps: a step of acquiring ultrasonic signals and a step of constructing images from data captured beforehand. These two steps may be carried out in various ways, which are presented below.

One of the main types of capture of ultrasonic signals to which data reconstruction algorithms are then applied is full-matrix capture (FMC) such as described in the document by C. Holmes, B. W. Drinkwater, P. D. Wilcox, entitled "Post-Processing of the full matrix of ultrasonic transmit-receive array data for nondestructive evaluation", NDT&E international vol. 38, pp 701-711, for example. In this case, for an ultrasonic sensor consisting of a plurality of individually controllable elements, this type of acquisition consists in capturing a set of MxN elementary signals, $S_i(t)$, with $1 \leq i \leq M$ and $1 \leq j \leq N$, where M and N are the number of elements used in emission and in reception, respectively. The index i denotes the number of the emitting element and the index j that of the receiving element. Other methods for acquiring data known to those skilled in the art such as plane wave imaging (PWI) or the synthetic aperture focusing technique (SAFT) may be used.

To construct images, synthetic focusing methods sum, coherently, the contributions extracted from the ultrasonic signals recorded beforehand for each point of the inspected zone of a material. These methods may be implemented in the time or frequency domain. Among these methods, the aforementioned TFM method is one of the main imaging methods. The associated algorithm coherently sums the amplitude of the received signals, constructive interference, and thus amplitude maxima, thereby being obtained for the locations in which the defaults that caused the detected ultrasonic echoes are actually located. This algorithm is mainly based on the exploitation of times-of-flight theoretically evaluated from direct models. This algorithm may be said to essentially consist of three steps:

1. The definition of a reconstruction zone (positions, dimensions and number of computation points),
2. For each point P of the defined reconstruction zone and for each emitter-receiver pair (ij), computation of the theoretical time-of-flight $T_{ij}(P)$ corresponding to the path between the emitter i and the receiver j and passing through the point P,
3. For each point P of the zone, summation of amplitudes extracted from the signals $S_{ij}(t)$ at the time $t=T_{ij}(P)$; this may be written:

$$I(P) = \sum_{i=1}^{M} \sum_{j=1}^{N} S_{ij}(T_{ij}(P)). \quad (1)$$

This focusing may be achieved by considering, in the second step, a plurality of propagation modes (direct propagation, corner echoes, indirect echoes, etc.), and a plurality of types of wave (longitudinal (L) or transverse (T) waves) such as for example described in the document by A. Fidahoussen, P. Calmon, M. Lambert, S. Paillard, S. Chatillon, "Imaging of defects in several complex configurations by simulation-helped processing of ultrasonic array data", Review of progress in QNDE, Vol. 29, pp. 847-854, 2010.

Figure 1A:
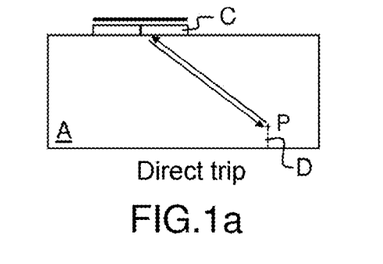
FIGS. 1a, 1b, 1c, an illustration of the various types of path.
Figure 1B:
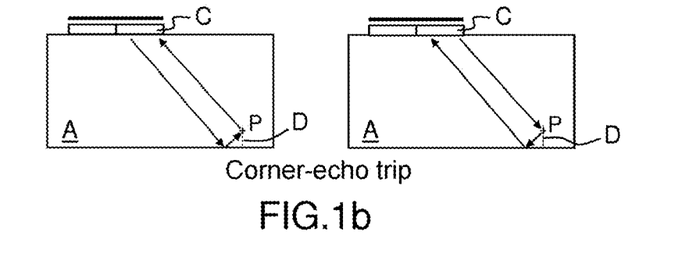
Figure 1C:
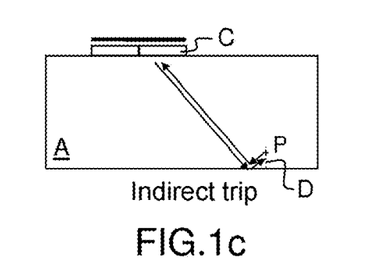

FIGS. 1a, 1b and 1c illustrate various types of path. For the direct reconstruction mode (FIG. 1a) the travel paths in play correspond to direct paths between the various elements of the sensor C and the points P of the reconstruction zone, i.e. with no reflection from the bottom of the part, as illustrated in FIG. 1a. For corner-echo and indirect-echo reconstruction modes (FIGS. 1b and 1c), the paths taken into account for the computation of the times-of-flight in equation (1) may include one or more reflections from the bottom of the part A during the path between the emitting element and the point of the reconstruction zone and/or during the path between the reconstruction point and the receiving element. The longitudinal or transverse polarization of the wave between two successive interactions is also taken into account.

The fact that each TFM reconstruction is associated with one propagation mode (direct mode, corner-echo mode, multiple reflections in the part, etc.) and with the (longitudinal or transverse) polarity of the ultrasonic waves gives rise to a substantial number of images, each of which may contain different and complementary information on the position, on the nature and on the geometry of the sought-after defects D.

The relevance of an image associated with a given propagation mode varies depending on the testing configuration in question (sensor used, geometry of the inspected part, position and orientation of the defect, etc.). This relevance is in addition not necessarily true for all the points of a given reconstruction zone.

Figure 2:
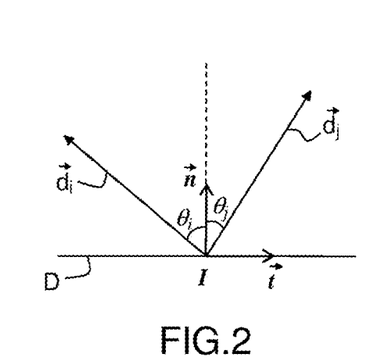
FIG. 2, an illustration of a reflection counter according to the prior art.

The prior art also describes a "reflection counter", illustrated in FIG. 2. For a planar defect D of known orientation, this estimator consists in counting the number of emitter-receiver pairs (i,j) for which a path respecting Snell's law (FIG. 3) exists for the reconstruction mode in question. Thus, for a reconstruction mode m, assuming that each point P of the reconstruction zone belongs to a planar defect of normal $\vec{n}$, the reflection counter, which is denoted $C^m(P, \vec{n})$, is given by:

$$C^m(P, \vec{n}) = \sum_{i,j=1}^{N} c_{ij}^m(P, \vec{n}) \qquad (2)$$

$$\text{where } c_{ij}^m = \begin{cases} 1 & \text{if } |\vec{n}_{ij}^m(P) \cdot \vec{n}| = 1 \\ 0 & \text{if not} \end{cases}$$

Figure 3:
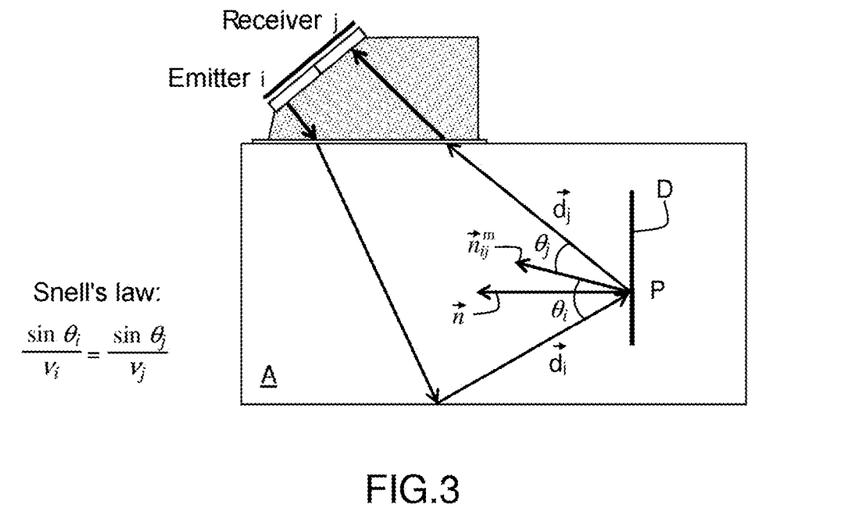
FIG. 3, an illustration of a path respecting Snell-Descartes law.

$\vec{n}_{ij}^m$ (P): the normal formed by the forward and toward directions $\vec{d}_i$, $\vec{d}_j$, of the wave,
i: emitting-element index,
j: receiving-element index,
N: number of emitting-receiving elements of the transducer,
$\theta_i$, the angle that the forward direction $\vec{d}_i$ makes to the normal $\vec{n}_{ij}^m$ for a reconstruction mode m, and $\theta_r$, the angle that the backward direction $\vec{d}_r$ makes to the normal $\vec{n}_{ij}^m$ for a reconstruction mode m.

An ultrasonic reconstruction method is described, for example, in chapter 5.3.2 of the thesis entitled "*Développement de méthodes de reconstruction ultrasonore pour la localisation et la caractérisation de défauts*" [Development of ultrasonic reconstruction methods for locating and characterizing defects] presented by Alex Fidahoussen on Sep. 21, 2012.

Figure 4:
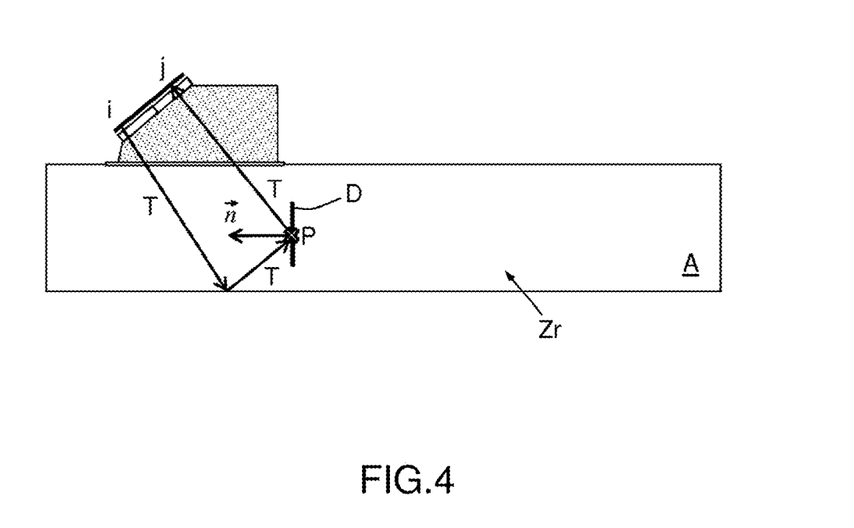
Figure 5:
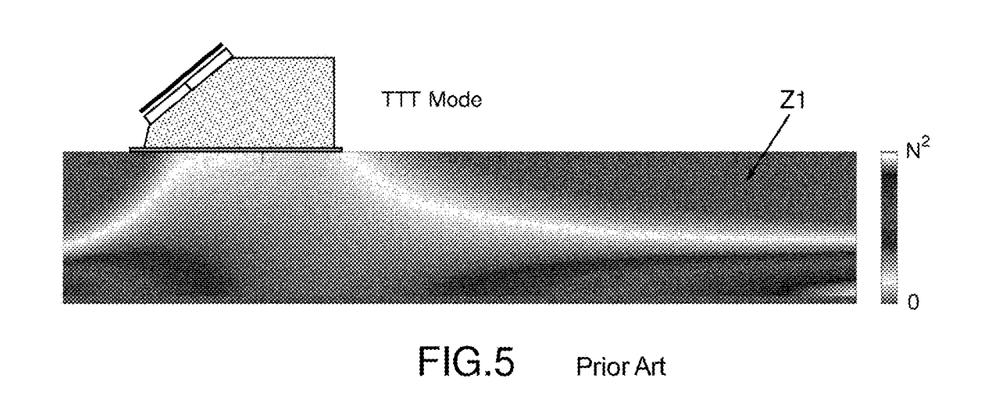

In the following example (FIG. 4) a planar defect D of vertical orientation in a given reconstruction zone Zr of an object A to be inspected will be considered for a reconstruction in corner-echo mode (i.e. with a reflection from the bottom of the object) taking into account only transverse (T) waves. The evaluation of the reflection counter $C^m(P, \vec{n})$ at each point P of this reconstruction zone Zr allows a map (FIG. 5) to be drawn the values of which are coded using a palette of colors, which has been represented in the figure by zones in shades of gray. Thus, for one reconstruction mode m, this map indicates that in the zone Z1 (Amplitude=0), no specular path is possible between an emitter i, a planar defect of vertical orientation and a receiver j. This estimator provides necessary but insufficient information to fully predict the relevance of a reconstruction mode to detection of a planar defect of known orientation located in the reconstruction zone. Specifically, the reconstruction mode considers only geometric paths; however, other physical considerations must also be taken account.

Patent application FR 3 029 636 describes a TFM ultrasound imaging method using a phased-array transducer and based on the total focusing method (the TFM method is said to be "de focalisation en tous points" in French).

SUMMARY OF THE INVENTION

One of the objectives of the invention is to provide a tool allowing, for a given configuration of the defect-detecting system and for one type of sought-after defect, the one or more most relevant reconstruction modes m, i.e. the modes that may be used to obtain a better visualization and characterization of defects present in a part, to be predicted. More precisely, for each point P belonging to a reconstruction zone Zr, this tool makes it possible to estimate the capacity of a reconstruction mode to be able to detect or not the features of a planar defect from specular echoes the path of which respects Snell's law, such as described in document https://en.wikipedia.org/wiki/Snell %27s_law or, more generally, of any planar element or object of known orientation and that reflects ultrasonic waves.

The one or more reconstruction modes selected on the basis of these mode-capacity results will then be used in a system for detecting and characterizing defects.

The invention may notably be likened to a specular-echo estimator for the reconstruction mode in question. The estimator notably consists in computing, for each point of a zone of interest, the unitary contribution of each emitter-receiver pair (i, j) of a detecting sensor to a specular echo originating from a planar defect of predefined orientation. This computation may be carried out by means of a tool for simulating the propagation of elastodynamic waves, such tools being known to those skilled in the art.

The summation of all these (reflected energy) contributions for each of the points of a zone of interest then allows the detection amplitude of one type of defect to be predicted by a specular echo. A map of these amplitudes, i.e. a map that is analogous to the one proposed for the prior-art reflection counter, but more precise, may thus be produced and, on the basis of this map, an operator will be able to select one or more reconstruction modes to use to inspect an object.

The invention relates to a method for determining at least one mode m of reconstruction of a reflecting object having a portion capable of generating specular reflections of ultrasonic waves, within a given volume Zr, characterized in that it comprises at least the following steps:

for each point P of the given volume Zr, determining an ultrasonic field value $A_{ij}^m$ (P) for N emitter-receiver pairs (i, j) and for one detection mode m, computing a number $$C^m(P, \vec{n}) = \sum_{i,j=1}^{N} c_{ij}^m(P, \vec{n})$$

of reflections of the wave where $$c_{ij}^m = \begin{cases} 1 & \text{if } |\vec{n}_{ij}^m(P) \cdot \vec{n}| = 1 \\ 0 & \text{if not} \end{cases}$$

with $\vec{n}_{ij}^m$ (P) the normal formed by the "forward" direction $\vec{d}_i$ and the "backward" direction $\vec{d}_j$ of the ultrasonic wave emitted and reflected by the reflecting element, computing the energy value $E^m(P, \vec{n})$ for each point P of the zone Zr, with $\vec{n}$ the normal to the reflecting element, and for a plurality of detection modes m, by summing, over the N emitter-receiver pairs (i, j) the product of the value of the ultrasonic field and the number of reflections of the wave:
with $$E^m(P, \vec{n}) = \sum_{i,j=1}^{N} A_{ij}^m(P) c_{ij}(P, \vec{n})$$

comparing said one or more obtained energy values $E^m(P, \vec{n})$ to a given criterion and, on the basis of the obtained result, selecting at least one reconstruction mode m to be used to detect and characterize the reflecting element.

According to one variant embodiment, the one or more reconstruction modes m to be used are determined by choosing the energies $E^m(P, \vec{n})$ that are higher than a threshold value Es.

According to another variant, the one or more reconstruction modes m to be used are determined while limiting the number of reconstruction modes to a given value, providing the best compromise between energy and dimension of the selected reconstruction zone.

The computation of energy may take into account reflection coefficients $R(\vec{n}_{ij}, \vec{n})$ corresponding to the interaction of the wave with a planar surface defined by the normal $\vec{n}$ to a point P:

$$E^m(P, \vec{n}) = \sum_{i,j=1}^{N} A_{ij}^m(P) R(\vec{n}_{ij}, \vec{n}) c_{ij}(P, \vec{n}).$$

The energy value is, for example, determined by taking into account the number of reflections, weighted by an arbitrary tolerance:

$$c_{ij}^m(P) = \begin{cases} 1 & \text{if } |\vec{n}_{ij}^m(P) \cdot \vec{n}| = 1 \pm \varepsilon \\ 0 & \text{if not} \end{cases}.$$

The reflecting element to be detected may be a planar defect, such as a fault or notch, located in a part to be inspected.

The invention also relates to a device for determining at least one mode of detection of an element that reflects ultrasonic waves, within a given volume Zr and by specular reflection, and for characterizing one or more defects in a part A, comprising at least one ultrasound transducer for emitting and receiving ultrasonic waves and a processing device suitable for using the one or more reconstruction modes obtained by implementing the following steps:

for each point P of the given volume Zr, determining an ultrasonic field value $A_{ij}^m(P)$ for N emitter-receiver pairs (i, j) and for one detection mode m, computing a number $$C^m(P, \vec{n}) = \sum_{i,j=1}^{N} c_{ij}^m(P, \vec{n})$$

of reflections of the wave where $$c_{ij}^m = \begin{cases} 1 & \text{if } |\vec{n}_{ij}^m(P) \cdot \vec{n}| = 1 \\ 0 & \text{if not} \end{cases}$$

with $n_{ij}^m(P)$ the normal formed by the "forward" direction $\vec{d}_i$ and the "backward" direction $\vec{d}_j$ of the ultrasonic wave emitted and reflected by the reflecting element, computing the energy value $E^m(P, \vec{n})$ for each point P of the zone Zr, with $\vec{n}$ the normal to the reflecting element, and for a plurality of detection modes m, by summing, over the N emitter-receiver pairs (i, j) the product of the value of the ultrasonic field and the number of reflections of the wave:
with $$E^m(P, \vec{n}) = \sum_{i,j=1}^{N} A_{ij}^m(P) c_{ij}(P, \vec{n})$$

comparing the obtained energy values $E^m(P, \vec{n})$ to a given criterion and on the basis of the obtained result selecting at least one reconstruction mode m to be used to detect and characterize the reflecting element.

BRIEF DESCRIPTION OF THE DRAWINGS

The method and device are for example used to detect defects in a part subjected to ultrasonic waves.

The invention will be better understood and other advantages will become apparent on reading the following description of nonlimiting examples that are given by way of illustration, which description is given with reference to the figures, which show:

FIG. 4, an illustration of a reconstruction zone within an object, and, FIG. 5, a map of the estimator of the prior-art "reflection counter" for one reconstruction mode, FIG. 6, an example device for implementing the method according to the invention, FIG. 7, a result of mapping of the most favorable detection zones, which was obtained after implementation of the method according to the invention, and FIG. 8, an illustration of the prediction by the invention of the ability to detect two identical defects located in two different regions of the object A.

DETAILED DESCRIPTION

The idea implemented for the method according to the invention notably consists in determining an adapted reconstruction mode, allowing an image of a defect to be precisely and reliably obtained, for one known inspection configuration and one type of sought-after defect. The mode thus obtained may then be used for the detection and characterization of defects in an object to be inspected.

To be applied, the method according to the invention requires there to be known beforehand a certain number of pieces of information on the part to be inspected and on the testing device. The required pieces of information are then the same as those required to obtain the image of the defect.

These pieces of information relate to:

The part to be inspected:
Knowledge of the geometry of the part, through its thickness,
Knowledge of the velocities of propagation of the waves of interest (longitudinal (L) waves and transverse (T) waves),
Other physical properties to be taken into account: anisotropy, attenuation of the waves in question, etc. to model the propagation of a wave in the part to be studied, and to perform the computation of the field, The one or more phase-array transducers of the sensor:
The elementary division: linear, matrix array, annular, etc.,
The number of elements in question: N,
The pitch, measured center-to-center, between the constituent elements of the sensor, in order to compute the times-of-flight required between an emitter, a focus point of the part and a receiver, the coordinates of the elements of the sensor being known,
The type of coupling: coupling by immersion or by contact,
The geometry of the wedge of the sensor, and its physical properties (velocity of the waves passing through it), in order to estimate the time-of-flight of the ultrasonic wave in the wedge. The total time-of-flight is the sum of the travel time in the wedge and the travel time in the material to be inspected, The one or more positions of the sensor on the part during the acquisition of the signals:
The configuration of the emitting and receiving elements, i.e. for each shot, the definition:
of the one or more elements active in emission, with their associated delay law,
of the one or more elements active in reception, with their associated delay law.
The orientation of the sought-after planar defect, defined by its normal $\vec{n}$,
The set of reconstruction modes to be considered,
The zone of interest Zr in which the reconstructions are performed.

These parameters are implemented in the computation of the tool or estimator of the reconstruction mode according to the invention.

For each possible reconstruction mode m, the invention consists in determining, on the basis of a specular-echo estimator, the capacity of this mode to be able to deliver or not, by specular reflections, the image of a planar defect, of known orientation, located at any point P of the zone of interest Zr or reconstruction zone. To do this, the estimator must deliver, for all this reconstruction zone Zr, an estimation of the ultrasonic energy reflected following this type of reflection, for example. The higher the energy computed by the estimator, the better the detection capacity of the reconstruction mode in question will be. The estimator is in addition capable of delivering comparable energy values for all the reconstruction modes in question. The adopted reconstruction mode will then be able to be implemented in a system for detecting and characterizing defects. The steps allowing this estimator to be obtained are detailed further on in the description.

Figure 6:
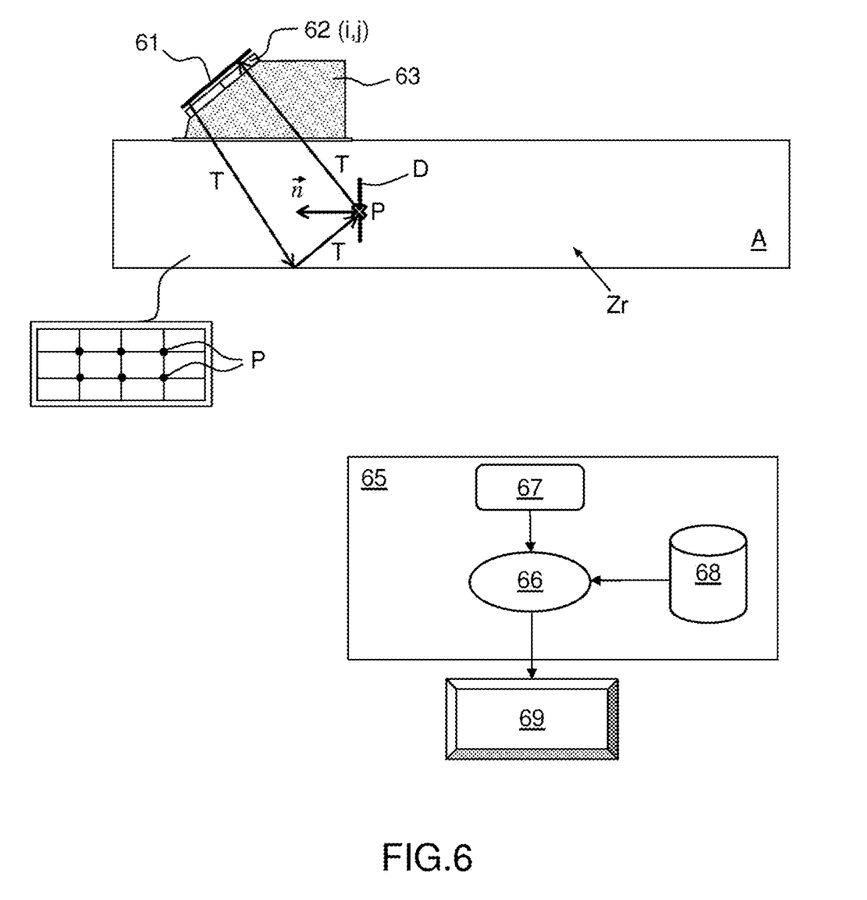

FIG. 6 illustrates an example device allowing the estimator according to the invention to be implemented during the inspection of a part. The device comprises a sensor 61 (ultrasound transducer for example) comprising a plurality of emitter-receiver elements 62(i,j), taking the form of a linear array for example, said elements being adapted to emit and receive ultrasonic waves, the detector for example being positioned on a holder 63. The emitter-receivers emit ultrasonic waves that are reflected within the part, which may contain a defect D. The reflected signals are captured by the receiving matrix array (receivers) and digitized using a principle known to those skilled in the art. The corresponding digital signals are, for example, stored in a file or a memory (not shown for the sake of simplicity) in order to be processed in real-time or subsequently. Simultaneously, the position of the sensor corresponding to a capture of signals reflected and captured by the receiving matrix array of the sensor is stored.

The method according to the invention has allowed a tool or estimator that will allow, for example, one or more reconstruction modes that are the most effective at detecting defects in an examined part to be detected to be obtained. One way of implementing this estimator for example consists in transmitting the experimental data of the digitized signals and the position of the detecting sensor to a processing device 65 comprising a processor 66 on which the estimator 67 is executed in order to reconstruct an image of the inspected part from signals received from the detecting sensor and stored for example in a database 68.

The processor may also comprise an output connected to a device 69 for displaying values thus obtained possibly taking the form of a map allowing an operator to locate those zones of the part in which a defect will possibly be best detected, as a function of a reconstruction mode, and therefore to select the best reconstruction mode.

The method and device according to the invention may be used in the case of immersion tests, which assume that the device is submerged in a liquid, water in most cases, the waves then propagating through the liquid before refracting into the material. In another application, it is employed for contact tests, which assume that the sensor is placed on a wedge that then forms the intermediate medium between the sensor and the part to be inspected.

For the implementation of the method according to the invention, a mesh is defined in the detection zone, in order to mark out the points P considered in the method according to the invention. The letter P designates the points of the mesh whatever their coordinates. The mesh is defined as a compromise between the obtainment of a quality image and the computation time. For example, the pitch of the mesh will be about $\lambda/6$ with $\lambda$ the value of the wavelength or even comprised in the interval $[\lambda/8, \lambda/4]$.

The detection amplitude (i.e. the energy Ed) for a defect D may then be determined by summing the unitary contributions, of each emitter-receiver pair, computed at each of the points P of the mesh of the reconstruction zone Zr.

For one reconstruction mode m, the specular-echo estimator, in its simplest expression, firstly consists in computing the following unitary quantities, for each point P of the zone of interest and for the following parameters: $A_{ij}^{m}(P)$: the ultrasonic field for each set of emitter(s) i and receiver(s) j in the configuration defined during the acquisition. By configuration, reference is being made to the set of acquisition parameters that must be taken into account for the computation of the field, which parameters were listed above. The configuration may be computed by means of a software package for simulating the propagation of elasto-dynamic waves, for example the aforementioned software package CIVA developed and sold by the CEA, which is available in the publication, "CIVA: An expertise platform for simulation and processing NDT data", Ultrasonics volume 44 Supplement, 22 Dec. 2006, Pages e975-e979, Proceedings of Ultrasonics International (UI'05) and World Congress on Ultrasonics (WCU), $c_{ij}^m$ (P): the reflection counter is equal to 1 if $\vec{n}_{ij}^m$(P) is collinear to the normal ii to the defect and to 0 if not. One way of estimating $c_{ij}^m$ (P) may be given by:

$$c_{ij}^m(P) = \begin{cases} 1 & \text{if } |\vec{n}_{ij}^m(P) \cdot \vec{n}| = 1 \\ 0 & \text{if not} \end{cases} \quad (3)$$

with $\vec{n}_{ij}^m$ (P) the normal formed by the "forward" direction $\vec{d}_i$ and the "backward" direction $\vec{d}_j$, for the reconstruction mode m, corresponding respectively to the path of the ultrasonic wave associated with the set of the one or more emitters i, and to the path of the ultrasonic wave associated with the set of the one or more receivers j. di designates the direction of the path of the ultrasonic wave originating from the element i and arriving at P, and dj the direction of the ultrasonic path reflected at P and returning to element j of the sensor. These paths may be direct or via a reflection from the inspected part.

The unitary contributions of each element of the sensor, for a given mode m and for a point P of the mesh then result from the product of the field $A_{ij}^m$ (P) and of the reflection counter $c_{ij}^m$ (P).

The sought-after final ultrasonic energy (for selecting the reconstruction mode most suitable for detecting and characterizing a defect) is then determined by summing all the unitary contributions for each point P of the reconstruction zone. The points of the reconstruction zone are for example distributed in the form of a grid the vertices of which correspond to the points P. Denoting this energy $E^m(P,\vec{n})$, one way of estimating it is given by the following relationship:

$$E^m(P, \vec{n}) = \sum_{i,j=1}^{N} A_{ij}^m(P) c_{ij}^m(P, \vec{n}). \quad (4)$$

For the reconstruction mode m, an energy value $E^m(P,\vec{n})$ corresponding to the ultrasonic energy collected by the sensor (all of the elements) after reflection from a planar defect of known orientation is obtained for one point P of the mesh.

The energy is computed for a plurality of possible reconstruction modes m, for all of the points P of the mesh and in the reconstruction zone in question. These energy values may be represented in the form of a map, or of a table that indicates, for each given point P of the mesh, the corresponding energy value, for one reconstruction mode.

The method will then exploit these results in order to define the reconstruction mode m that is most suitable for detecting and characterizing a planar defect present in the reconstruction zone.

According to one variant embodiment, the method will select the maximum energy value in the table and select the reconstruction mode m corresponding to this value, in order to execute for example a defect-seeking algorithm.

For example, it is possible to compare the one or more energy values $E^m(P,\vec{n})$ to a threshold value Es and, on the basis of the result obtained from the comparison, to select the energy values higher than this threshold value and therefore the modes to be used to detect and characterize a defect in a given reconstruction zone.

Another way of proceeding consists in using an interval [Emin, Emax] of energy values to select the modes to be used, thereby limiting the choice to a given number of reconstruction modes. In this variant, the choice of the one or more reconstruction modes to be used results from a compromise between the number of reconstruction modes and the energy values that allow a good visualization of the defects.

According to another variant embodiment, it is possible to improve the estimator defined in particular by formula (4) by taking into account other physical quantities such as the reflection coefficients $R(\vec{n}_{ij},\vec{n})$ corresponding to the interaction of the wave with a planar surface defined by the normal $\vec{n}$ to the point P. $R(\vec{n}_{ij},\vec{n})$ may be defined by analytical formulae or by a software package for simulating the propagation of elastodynamic waves known to those skilled in the art, such as the aforementioned software package CIVA.

One way of taking into account the reflection coefficients is the following:

$$E^m(P, \vec{n}) = \sum_{i,j=1}^{N} A_{ij}^m(P) R(\vec{n}_{ij}, \vec{n}) c_{ij}(P, \vec{n}). \quad (5)$$

Another variant consists in applying an arbitrary tolerance (E) to the reflection counter $c_{ij}^m$ (P), the following values of the counter being considered:

$$c_{ij}^m(P) = \begin{cases} 1 & \text{if } |\vec{n}_{ij}^m(P) \cdot \vec{n}| = 1 \pm \varepsilon \\ 0 & \text{if not} \end{cases} \quad (6)$$

The estimator according to the invention in particular allows a map that is more precise than those obtained by implementing known prior-art methods to be obtained and a reconstruction mode that is best suited to the geometry of a part and to a defect to be selected.

Figure 7:
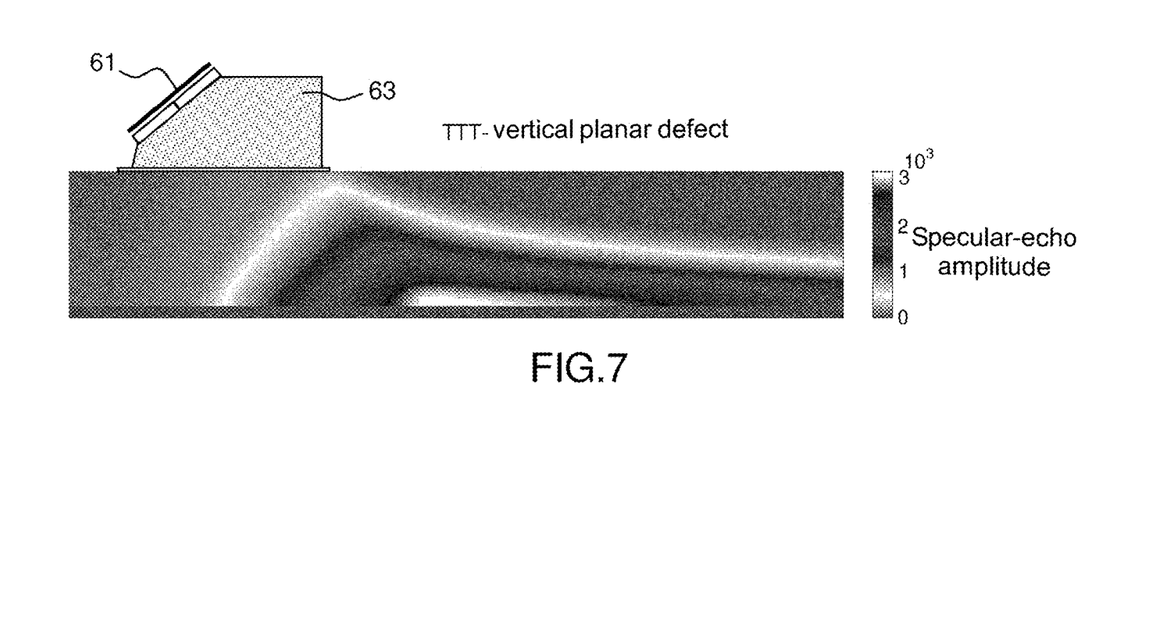

FIG. 7 illustrates the result obtained by implementing the method according to the invention. This specular-echo estimator may be represented in the form of a map showing the spatial distribution of energy in the zone of interest Zr. In this case, the amplitude of the energies at each point P is coded using a palette of colors, which has been represented in FIG. 7 by zones in shades of gray with a scale corresponding to the amplitude of the specular echoes.

Figure 8:
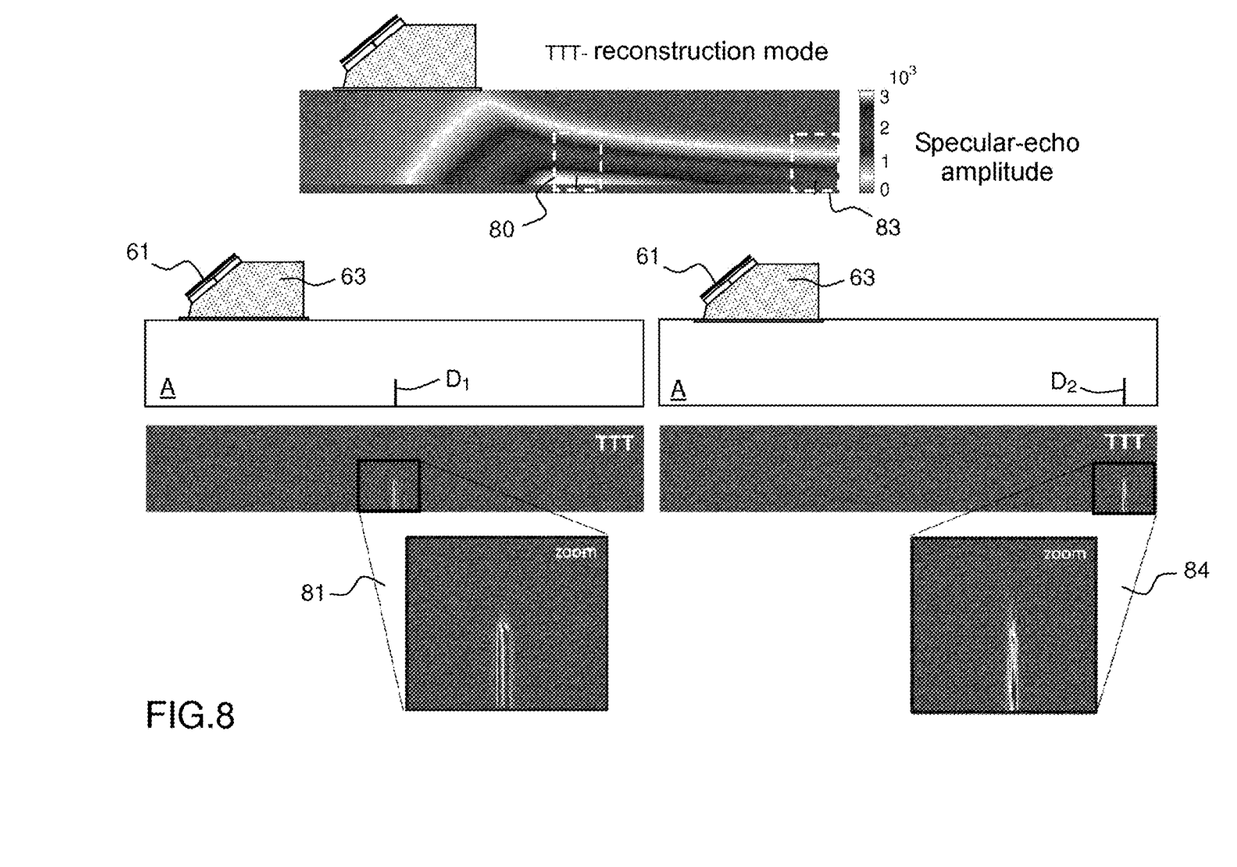

An example map obtained with formula (4) is illustrated in FIG. 8 for a TTT reconstruction mode and for two planar defects located in two locations in the part. In this example, by virtue of the information provided by this estimator, it is possible to predict that the ability of the reconstruction mode in question to detect a vertical planar defect will be proportional to the calculated energy. Thus, in the regions in which the energy is low (or even zero), this type of defect will not be detected, and conversely, in the regions in which the energy is high, the detection capacity will be maximal. For example, in the zone 80, which is a region of high detectability, the planar defect D1 is correctly detected over all its height, as is illustrated in 81. For the zone 83 of lower detectability, the vertical defect D2 is poorly detected, this being shown in 84.

The description applies to various reconstruction modes, for example, the TLT mode, the TTL mode, the LLT mode or other reconstruction modes known to those skilled in the art, such as those described in the document by Jie Zhang et al, entitled "Defect detection using ultrasonic arrays: the multi-mode total focusing method", NDT&E International, 43(2010) 123-133.

The method according to the invention makes it possible to quantitatively predict, for a given configuration, the capacity of a reconstruction mode to be able to detect a reflecting element in a precise region of an inspected zone.

The applications are many and diverse, and include the detection and characterization (nature, position, orientation) of defects in nondestructive testing using ultrasound.

The invention claimed is:

1. A method for determining at least one detection mode m of reconstruction of a reflecting object having a portion capable of generating specular reflections of ultrasonic waves, within a given volume Zr, comprising at least the following steps:

for each point P of the given volume Zr, determining an ultrasonic field value $A_{ij}^m(P)$ for N emitter-receiver pairs (i, j) and for the one detection mode m, computing a number $$C^m(P, \vec{n}) = \sum_{i,j=1}^{N} c_{ij}^m(P, \vec{n})$$

of reflections of the wave where $$c_{ij}^m = \begin{cases} 1 & \text{if } |\vec{n}_{ij}^m(P) \cdot \vec{n}| = 1 \\ 0 & \text{if not} \end{cases}$$

with $\vec{n}_{ij}^m(P)$ the normal formed by the "forward" direction $\vec{d}_i$ and the "backward" direction $\vec{d}_j$ of an ultrasonic wave emitted and reflected by the reflecting object, computing an energy value $E^m(P, \vec{n})$ for each point P of the given volume Zr, with $\vec{n}$ the normal to the reflecting object, and for a plurality of detection modes m, by summing, over the N emitter-receiver pairs (i, j) the product of the ultrasonic field value and the number of reflections of the wave:

with $$E^m(P, \vec{n}) = \sum_{i,j=1}^{N} A_{ij}^m(P) c_{ij}(P, \vec{n})$$

comparing one or more obtained energy values $E^m(P, \vec{n})$ to a given criterion and on the basis of the obtained result selecting the at least one reconstruction mode m to be used to detect and characterize the reflecting element.

2. The method as claimed in claim 1, wherein the at least one reconstruction modes m to be used are determined by choosing the energy values $E^m(P, \vec{n})$ that are higher than a threshold value Es.

3. The method as claimed in claim 1, wherein the at least one reconstruction modes m to be used are determined while limiting a number of reconstruction modes to a given value, providing the best compromise between energy and dimension of a selected reconstruction zone.

4. The method as claimed in claim 1, wherein a computation of energy takes into account reflection coefficients $R(\vec{n}_{ij}, \vec{n})$ corresponding to an interaction of the wave with a planar surface defined by the normal $\vec{n}$ to a point P:

$$E^m(P, \vec{n}) = \sum_{i,j=1}^{N} A_{ij}^m(P) R(\vec{n}_{ij}, \vec{n}) c_{ij}(P, \vec{n}).$$

5. The method as claimed in claim 1, wherein the energy value is determined by taking into account the number of reflections, weighted by an arbitrary tolerance:

$$c_{ij}^m(P) = \begin{cases} 1 & \text{if } |\vec{n}_{ij}^m(P) \cdot \vec{n}| = 1 \pm \varepsilon \\ 0 & \text{if not} \end{cases}.$$

6. The method as claimed in claim 1, wherein the reflecting object is a planar defect, like a fault or notch, located in a part to be inspected.

7. A device for determining at least one mode of detection of an element that reflects ultrasonic waves, within a given volume Zr and by specular reflection, and for characterizing one or more defects in an inspected part A, comprising an ultrasound transducer for emitting and receiving ultrasonic waves and at least one processing device in which an estimator is executed, said processing device being configured to determine and execute one or more reconstruction modes obtained by implementing the steps of the method as claimed in claim 1 in order to reconstruct an image of the inspected part from signals received by the ultrasound transducer.

8. The application of the method as claimed in claim 1 to a detection of defects in a part subjected to ultrasonic waves.

* * * * *